May 6, 1924.　　　　　N. B. STRICKLAND　　　　　1,492,865
FOOD COOKER
Original Filed April 24, 1923
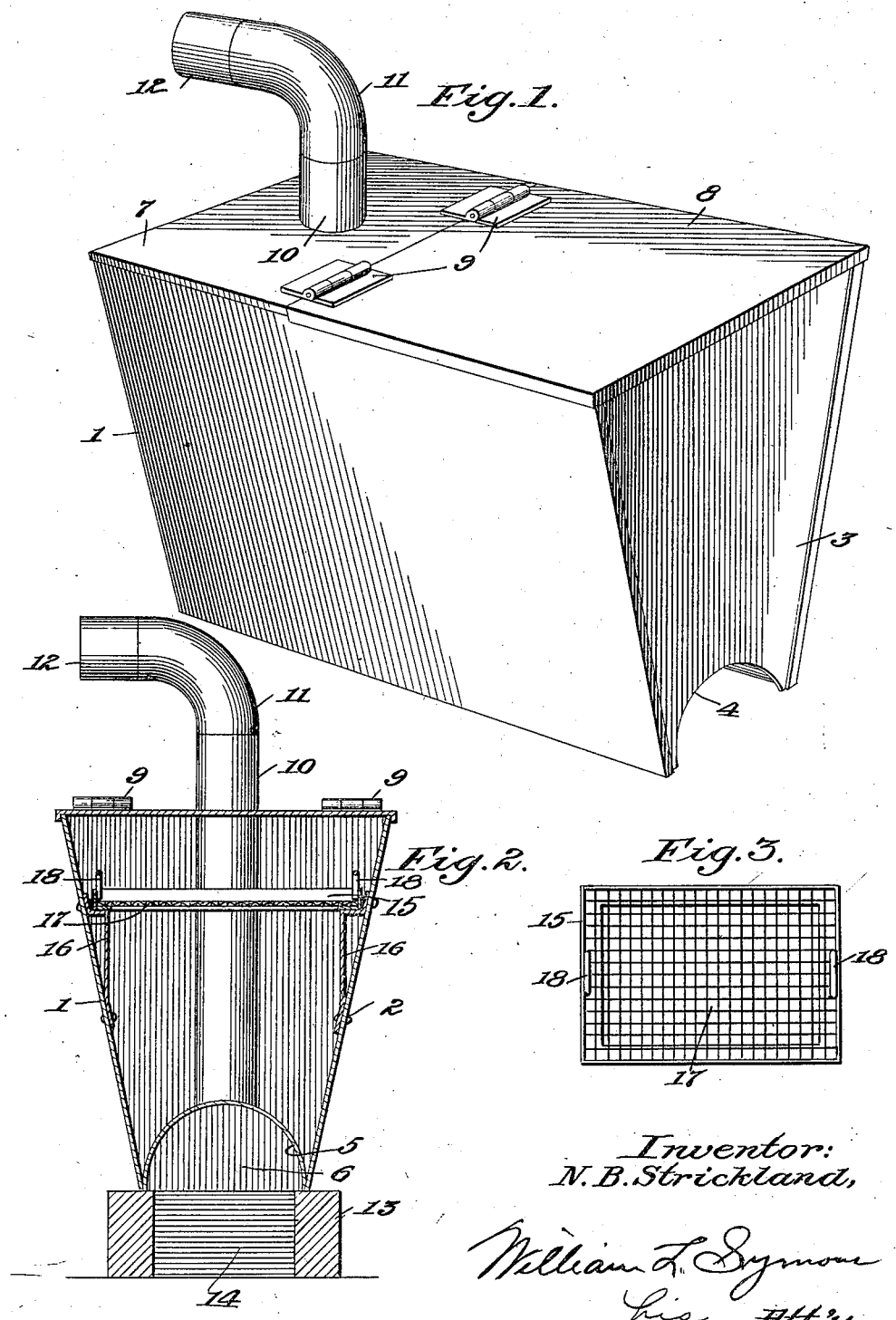

Patented May 6, 1924.

1,492,865

UNITED STATES PATENT OFFICE.

NATHAN B. STRICKLAND, OF OXFORD, NORTH CAROLINA.

FOOD COOKER.

Application filed April 24, 1923, Serial No. 634,411. Renewed March 22, 1924.

*To all whom it may concern:*

Be it known that NATHAN B. STRICKLAND, a citizen of the United States of America, residing at Oxford, in the county of Granville and State of North Carolina, has invented certain new and useful Improvements in Food Cookers, of which the following is a specification.

My invention relates to food cookers of the kind in which the cooking is done in a compartment filled with water or other fluid which is heated to the required temperature to cook the food.

Some of the objects of my invention are the construction of a food cooker which is capable of being moved from place to place, which has a large reservoir for holding the fluid in which the food is cooked and a relatively small firebox for heating the fluid, which is not complicated in design, which is efficient, and which is easy and inexpensive to manufacture.

With these and other objects in view, one embodiment of my invention is shown in the accompanying drawings in which:—

Figure 1 is a perspective view of my cooker;

Figure 2 is a vertical section thereof; and

Figure 3 is a plan view of a tray.

The reservoir of my cooker may be referred to as having generally the shape of an inverted frustum of a rectangular pyramid with the narrow base thereof hollowed out to form a half circle. The cooker may be made of sheet metal or other suitable material, the parts being joined by any of the well-known means of joining metal.

The sides 1 and 2 are duplicates. The lower part of the end 3 is cut out at 4 to conform with the bottom 5 of the reservoir as shown in Figure 2. The rear end 6 extends the same length as the sides. About one-third of the top 7 of the reservoir is fastened to the sides and the rear end. The front two-thirds of the top 8 is constructed in order to allow admission to the reservoir to put in the food or other materials to be cooked. The movable part of the top or lid 8 is attached to the fastened part 7 by hinges 9. A pipe 10 for the exit of smoke and gas extends from the base 5, through the reservoir and out through the top 7. This pipe may, if it is desired, have an elbow 11 and extension 12. It may be turned in the direction necessary to produce satisfactory heating or to carry the smoke and gas away from the person operating the cooker. In Figure 1, the extension pipe 12 is turned to the rear of the cooker, while in Figure 2 it is turned to the side.

The cooker may be placed on any suitable heating means such as a stove or furnace. As shown, it is placed on a base 13 of suitable height to form a space 14, in which fuel to heat the cooker may be burned.

In order to cook food placed in glass jars on which rubber rings are used as a part of the sealing means, I provide a rack or tray to prevent the glass jars being entirely submerged in the liquid in the cooker. A tray 15 of suitable size to fit the cooker is placed on brackets 16 attached to the sides of the cooker in any suitable way as by rivets. The bottom 17 of this tray may be made of wire mesh. Handles 18 to move the tray may be attached to the ends thereof.

In operating my cooker, after it is placed over suitable heating means, the reservoir is filled with water to the required height. Cans containing food to be cooked, such as fruits or vegatables, are then placed in the cooker and left in it the required length of time to completely cook the food. After the cooking is completed the cans may be removed by any suitable instrument and more cans may be put in, or the water may be allowed to cool suitably before the cans are removed.

By tapering the reservoir towards the bottom, a small fire space only is required and by expanding the reservoir towards the top, a large space is formed for water. Arching the bottom of the reservoir enables a large area of the reservoir to be affected directly by the heat from the fire. By extending the pipe through the reservoir the heat therefrom is utilized in heating the water.

Having described my invention, what I claim and desire to secure by Letters Patent is:

A food cooker, comprising a reservoir to contain a liquid, the base of said reservoir being narrower than the top thereof, the sides of said reservoir being straight and extending outwardly from the bottom to the top thereof, the bottom of said reservoir being substantially semi-circular in cross-section in a vertical plane, the curve extending upward, a top for said reservoir, substantially one-third of said top being secured to the sides and one end of said reservoir and substantially two-thirds of said top being constructed to open and close, and a pipe for smoke and gases extending vertically through that part of said reservoir having the top fastened thereto.

In testimony whereof I affix my signature.

NATHAN B. STRICKLAND.